Nov. 12, 1963  A. KUBITZEK  3,110,854
MOTOR CONTROL WITH BATTERY CHECKING DEVICE
Filed May 9, 1961
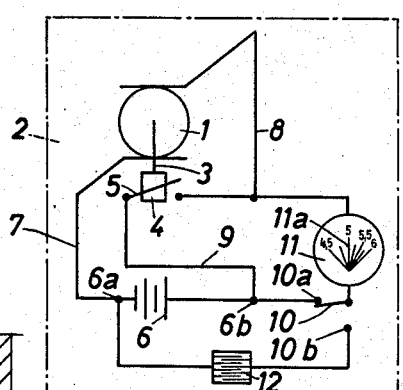
*Fig.1*
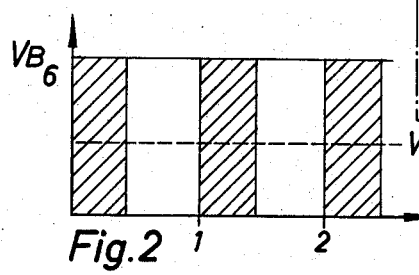
*Fig.1a.*
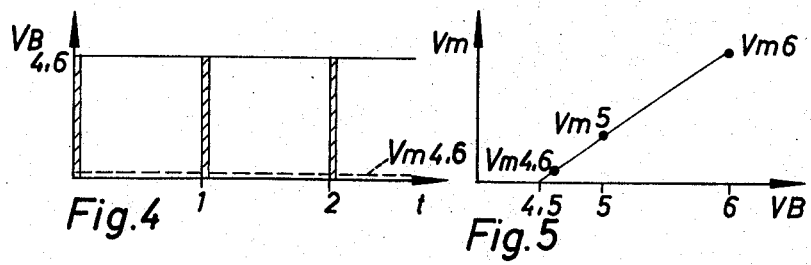
INVENTOR.
ALFRED KUBITZEK
BY Connolly and Hutz
ATTORNEYS United States Patent Office 3,110,854
Patented Nov. 12, 1963

3,110,854
MOTOR CONTROL WITH BATTERY CHECKING DEVICE
Alfred Kubitzek, Grunwald, near Munich, Germany, assignor to Agfa Aktiengesellschaft, Leverkusen, Bavaria, Germany, a corporation of Germany
Filed May 9, 1961, Ser. No. 108,849
Claims priority, application Germany May 21, 1960
6 Claims. (Cl. 318—490)

This invention relates to a device for checking the voltage of a battery connected to drive an electric motor through a current control means which governs the speed of the motor, and it more particularly relates to such a device for a motion picture camera whose motor speed is governed by a centrifugally operated current control means.

When a motion picture camera is driven by an electric motor supplied by a battery, it will only operate satisfactorily so long as the voltage of the battery is high enough to drive the motor at its rated speed. Various devices have therefore been proposed for checking the voltage of such batteries, but existing devices of this sort generally require that the battery voltage or some voltage which varies in a specific relationship to the battery voltage be directly measured regularly.

These motion picture cameras also include some means for regulating the speed of the motor which varies the amount of current drawn from the battery, and the battery voltage is adequate so long as it is strong enough to operate the motor at its rated speed without continuously energizing it at a substantially steady full current output. When a centrifugally operated on-and-off switch is used to govern the speed of the motor, the voltage falls below its minimum adequate values when it is necessary for this switch to maintain the battery continuously connected to the motor. This minimum value only exists when the battery is providing current, and therefore can only be inaccurately determined by available testing methods which measure the no load battery voltage. This requires an undue amount of surveillance by the operator and a knowledge of the relationship between the no load voltages, which can easily be measured, and those that exist at the required critical condition under load.

An object of this invention is to provide a device for checking the voltage of a battery driving an electric motor through a speed-governing current control means which is simple and economical to manufacture and directly indicative of the critical minimum adequate voltage under load.

Another object is to provide such a device which is particularly well adapted for use in a motion picture camera; and A further object is to provide such a device which is well adapted for combined use with an exposure indicating device.

In accordance with this invention a voltage detecting means is connected across the current control means for measuring the difference in potential across it as it causes the current supply to the electric motor to vary from maximum to minimum values so long as the battery voltage is sufficient to operate the electric motor at its required speed without continuously energizing it at a substantially steady full effective current output. This measured difference in potential changes in reverse relationship to the variance in current, and indicating means is connected to the detecting means for indicating the magnitude of difference in this change in response to the variance in current provided to the motor. This indicating means is arranged to warn an operator when the aforementioned change is not of sufficient magnitude to indicate that the voltage of the battery is sufficient to operate the electric motor at the required speed. When a centrifugally operated on-and-off switch for regulating the speed of the motor, the battery voltage is indicated to be adequate so long as the switch does not maintain the battery continuously connected to the motor.

The disadvantages of preexisting devices are avoided by this invention because the voltage is measured across the current control device. This voltage is zero when the current control device is not restricting the amount of current provided by the battery to the motor. However, the detecting means connected in parallel with the current control device measures the change in potential existing across the current control means caused by the varying current supply to the motor actuated by the speed governor. The measured change in potential is therefore a function of the excess in battery voltage over the minimum voltage necessary to operate the motor at its rated speed without continuously energizing it. Since this change in potential across the current control device decreases continuously as the available battery voltage decreases and is generally of appreciable initial magnitude, it can be used for accurately checking the condition of the battery.

Further in accordance with this invention, a measuring instrument for indicating this change of voltage has a measuring scale displaying the entire range of potential change across the current control means, and this scale is calibrated to directly indicate corresponding battery voltages for respective values of voltage change. This permits the voltage of the battery to be conveniently directly read from the scale. This type of scale is further improved in sensitivity in the lower range by arranging it to operate in accordance with a logarithmic relationship.

When a variable resistor is used for controlling the current supply to the motor, it is particularly advantageous to arrange the exposure measuring circuit to have the detecting and indicating devices and the photoelectric transducer of the exposure meter connected in parallel with the motor on the one hand, and the current control means and the battery connected in parallel with the motor upon the other hand. This permits the drop in voltage across the current control means to be also used for regulating the voltage applied across the photoelectric transducer.

Novel features and advantages of the present invention will become apparent to one skilled in the art from a reading of the following description in conjunction with the accompanying drawings wherein similar reference characters refer to similar parts and in which:

FIG. 1 is a schematic diagram of one embodiment of this invention;

FIG. 1a is a schematic diagram of a modification of a portion of the embodiment shown in FIG. 1;

FIGS. 2–4 are graphs of varying battery voltages, VB, in the embodiment shown in FIG. 1 plotted against time t; and FIG. 5 is a graph of the mean voltage, $V_m$, plotted against battery voltage, VB.

In FIG. 1 is shown an embodiment of this invention including an electric motor 1 for driving motion picture camera 2. On shaft 3 of electric motor 1, which is either its normal output shaft or a special regulating shaft, is mounted a centrifugally operated governor 4 for operating current control means 5, which is for example an on-off switch. The electrical circuit which energizes motor 1 leads from a battery terminal 6a on one side of battery 6 through electrical lead 7 to motor 1. The other side of motor 1 is connected through electrical lead 8 to current control switch 5, which is in turn connected through electrical lead 9 to the other terminal 6b of battery 6. A galvanometer 11 of a photoelectric exposure meter is connected between electrical lead 8 and battery terminal 6b through a double-throw switch 10. When the movable pole of double throw-switch 10 lies against contact 10a, galvanometer 11 is connected to battery terminal 6b. Photoelectric transducer 12 of the exposure meter, which is for example a photoelectric resistor, is connected between battery terminal 6a and the other contact 10b of double throw switch 10. As is apparent from FIG. 1, double throw switch 10 may also be arranged at the other side of galvanometer 11 if it is not necessary to regulate the voltage applied to the exposure meter.

The graphs in FIGS. 2–4 illustrate the duration of energization of the motor as the battery voltage varies. The cross-hatched areas represent the time during which the motor is deenergized by disconnection of the battery from it. In FIG. 2 with a full battery voltage of 6 volts, switch 5 is operated by speed governor 4 to remain open more than 40% of each cycle of operation as indicated by the corresponding cross-hatched areas. The mean voltage corresponding to 6 effective battery volts is therefore approximately 40% of full voltage. The deenergized time during each cycle decreases with the battery voltage, and it is therefore in FIG. 3, which represents a battery voltage of 5 volts, less than 20% of the operating cycle, and at 4.6 battery volts described in FIG. 4, less than 10% of the operating cycle is deenergized with corresponding decreases in mean voltage $Vm$ 5 and $Vm$ 4.6. The mean voltage values, $Vm$, at galvanometer 11 shown in FIG. 5 accordingly proportionally decrease with the decrease in battery voltage, VB, from 6 to 5 to 4.6 volts. This causes contact 5 to remain continuously closed when the battery voltage drops to 4.5 volts to continuously energize motor. The scale 11a of galvanometer 11 is therefore arranged to indicate that 4.5 volts is not adequate to operate the motor at rated speed.

The scale of galvanometer 11 therefore indicates the mean voltage values $Vm$ corresponding to battery voltage VB. However, as shown in FIGS. 1 and 2, scale 11a can be directly calibrated to indicate the effective battery voltage values corresponding to the mean voltage values that are being measured. Furthermore, it is advantageous to utilize a galvanometer 11 operating in accordance with a logarithmic relationship to provide as fine as possible an indication in the critical lower voltage ranges.

A similar arrangement as shown in FIG. 1a, having infinitely variable characteristics is obtained by utilizing a variable resistor 5a for controlling the current provided to motor 1 instead of switch 5. The detecting and indicating instrument then indicates not the mean voltage but the potential drop directly. It is conventional to provide a range of different operational speeds for the camera, for example, by shifting the ratio of a geared transmission connected between the motor and film drive. In that case several indicating scales corresponding to each different speed can be provided upon galvanometer 11 if necessary.

In the arrangement shown in FIG. 1a utilizing a variable resistor 5a, double-throw switch 10 in the position shown in broken outline applies the voltage supplied to motor 1 (disregarding the voltage loss across galvanometer 11) also to photoelectric transducer resistor 12. This dispenses with the necessity of providing a separate battery for the exposure meter under certain conditions. Furthermore any variance in the effective voltage of battery 6 does not affect the exposure measurement because the voltage applied to photoresistor 12 is regulated by variable resistor 5a.

What is claimed is:

1. A device for checking the voltage of a battery connected to drive an electric motor through a circuit including current control means for governing the speed of said electric motor, said device comprising voltage detecting means connected across said current control means for measuring the difference in potential across said current control means, said current control means varying the current supplied to said electric motor from maximum to minimum values so long as said voltage is sufficient to operate said electric motor at its rated speed without continuously energizing it at a substantially steady full effective output whereby said difference in potential changes in a reverse relationship, and indicating means connected to said detecting means for indicating the magnitude of said change in said difference in potential as said current control means causes it to vary, said indicating means being arranged to warn an operator when said change is not of sufficient magnitude to indicate that said voltage of said battery is sufficient to operate said electric motor at its rated speed and said indicating means including a visible scale which is arranged to indicate corresponding battery voltages.

2. A device as set forth in claim 1 wherein said current control means comprises a centrifugally operated on-and-off switch.

3. A device as set forth in claim 1 wherein said current control means comprises a variable resistor.

4. A device as set forth in claim 1 wherein said scale is logarithmically arranged to provide a fine indication of minimum adequate voltage.

5. A device for checking the voltage of a battery connected to drive an electric motor through a circuit including current control means for governing the speed of said electric motor, said device comprising voltage detecting means connected across said current control means for measuring the difference in potential across said current control means, said current control means varying the current supplied to said electric motor from maximum to minimum values so long as said voltage is sufficient to operate said electric motor at its rated speed without continuously energizing it at a substantially steady full effective output whereby said difference in potential changes in a reverse relationship, indicating means connected to said detecting means for indicating the magnitude of said change in said difference in potential as said current control means causes it to vary, said indicating means being arranged to warn an operator when said change is not of sufficient magnitude to indicate that said voltage of said battery is sufficient to operate said electric motor at its rated speed, an exposure meter being installed upon said camera, said exposure meter having an indicating instrument, and said indicating instrument being optionally connectable across said current control means through a switch to permit said exposure meter to be alternately used for indicating exposure condition and the voltage of said battery.

6. A device as set forth in claim 5 wherein said exposure meter includes a photoelectric transducer, and said switch in its battery-checking position connecting said detecting means and said photoelectric transducer in parallel with said electric motor on the one hand in parallel with said current control means and said battery on the other hand to permit said drop in potential across said variable resistor to be used for also regulating the voltage across said transducer.

References Cited in the file of this patent

UNITED STATES PATENTS

| | | |
|---|---|---|
| 753,243 | Dettmar | Mar. 1, 1904 |
| 3,006,239 | Smolar | Oct. 31, 1961 |
| 3,016,244 | Schuh et al. | Jan. 9, 1962 |